United States Patent [19]
Adams, Sr.

[11] Patent Number: 6,004,063
[45] Date of Patent: Dec. 21, 1999

[54] ADJUSTABLE 3-WAY SCAFFOLD FASTENERS

[76] Inventor: Randy B. Adams, Sr., 284 Queen St., Ext., Stephenville NF, Canada, A2N-2P9

[21] Appl. No.: 08/980,691

[22] Filed: Nov. 13, 1997

[51] Int. Cl.$^6$ ....................................................... F16B 1/00
[52] U.S. Cl. ........................ 403/205; 403/400; 403/217; 403/170
[58] Field of Search ................................... 403/205, 398, 403/400, 384, 217, 218, 170

[56] References Cited

U.S. PATENT DOCUMENTS

| | | | |
|---|---|---|---|
| 4,066,371 | 1/1978 | Chapman | 403/218 |
| 4,136,985 | 1/1979 | Taul | 403/218 X |
| 4,226,551 | 10/1980 | Beasley . | |
| 4,355,725 | 10/1982 | Humphrey | 403/205 X |
| 4,421,434 | 12/1983 | Magner | 403/205 X |
| 4,449,842 | 5/1984 | Reichman, Jr. | 403/217 X |
| 4,545,490 | 10/1985 | Hsiao et al. . | |
| 4,685,576 | 8/1987 | Hobson | 403/217 X |
| 4,947,962 | 8/1990 | Helsper . | |
| 5,411,154 | 5/1995 | Vargo . | |
| 5,535,974 | 7/1996 | Savitski . | |

*Primary Examiner*—Terry Lee Melius
*Assistant Examiner*—William L. Miller
*Attorney, Agent, or Firm*—Richard L. Miller, P.E.

[57] ABSTRACT

Adjustable 3-way scaffolding fasteners for holding together four corners of a scaffold with four upright members, two first cross members with extremes, and two second cross members with extremes. The fasteners include a pair of right fasteners and a pair of left fasteners. Each fastener of the pair of right fasteners connects one extreme of the extremes of one cross member of the two first cross members and one extreme of the extremes of one cross member of the two second cross members to an upright of the four upright members of the scaffold, and are separate and diametrically opposed to each other when being used. Each fastener of the pair of left fasteners connects the other extreme of the extremes of the one cross member of the two first cross members and the other extreme of the extremes of the one cross member of the two second cross members to another upright of the four upright members of the scaffold, and are separate and diametrically opposed to each other and opposite to the pair of right fasteners when being used.

9 Claims, 1 Drawing Sheet

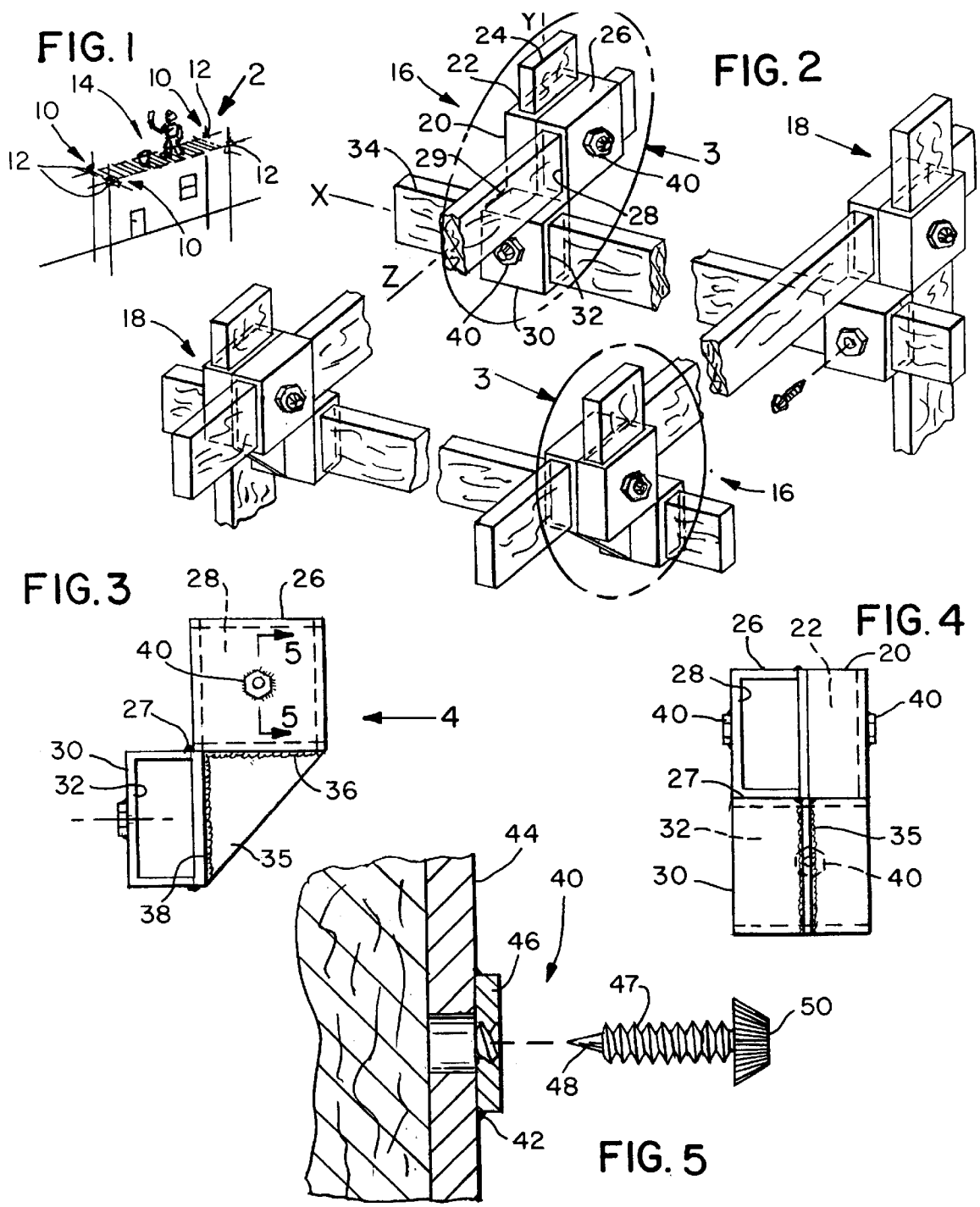

ADJUSTABLE 3-WAY SCAFFOLD FASTENERS

BACKGROUND OF THE INVENTION

1. Field of the Invention

The present invention relates to fasteners. More particularly, the present invention relates to adjustable 3-way scaffold fasteners.

2. Description of the Prior Art

Numerous innovations for joining devices have been provided in the prior art that will be described. Even though these innovations may be suitable for the specific individual purposes to which they address, however, they differ from the present invention.

FOR EXAMPLE, U.S. Pat. No. 4,226,551 to Beasley teaches three elongate members such as rods or tubes forming mutually perpendicular upright transoms and ledgers in a scaffolding structure that are interconnected by engagement of a bracket carried at one end of a first (horizontal) member in a socket provided in a second (upright) member, a third horizontal member being engaged between the end and the second member and retained in position by a wedge element. The wedge element is jammed in position by tightening a clamping nut, and use may be made of standard pipes such as scaffolding tubes.

ANOTHER EXAMPLE, U.S. Pat. No. 4,545,490 to Hsiao et al. teaches an assembly rack having a plurality of steel angles each having its two sides bent into L-shaped guide edges which define a guide groove, and provided with a series of holes in each side, and a plurality of slightly L-shaped joint members of sheet metal having a guide groove on each side and provided with screw holes one in each side of the guide groove. The guide edges of the steel angles are engaged in the grooves of the joint members and the two extended portions of the joint members are fitted into the guide grooves of the angles. Vertical and horizontal steel angles thus joined by the joint members are fastened to the joint members by bolts, and the horizontal angles can be positioned at different locations along the vertical steel angles.

STILL ANOTHER EXAMPLE, U.S. Pat. No. 4,947,962 to Helsper teaches an adjustable scaffold support for use in supporting construction scaffold plank members that includes a vertical guide member defining an elongated vertical guide track. An extension member is slidably received in the guide track and is secured in a selected adjusted position by a spring steel clamp and a set screw. A pivotal support member has a lower end pivotally connected to a lower end of the extension member. A pair of rectangular channel brackets are provided on upper end portions of the extension member and pivotal support member for engagement with a scaffold support plank. The scaffold support includes an A-frame supporting structure provided with selectively extensible ground insertion spikes for securing the scaffold support at an intended location.

YET ANOTHER EXAMPLE, U.S. Pat. No. 5,411,154 to Vargo teaches a readily assembled and disassembled static structure such as a scaffolding or a rack for shelving, bracing or the like that is composed of a plurality of elongated metallic support members fastened together in a predetermined precise arrangement. Each support member contains at least one row in a longitudinal direction of identically sized holes in the shape of a polyhedron having four sides or a multiple thereof. The support members are fastened together using a bolt which has an unthreaded portion adjacent the head of the bolt adapted to engage the shaped holes, and a nut threaded onto said bolt. The end of the bolt includes an extension beyond the threads which can be struck with a hammer during disassembly of the support without causing damage to the threads. Channels and angle bracing preferably are used as the support members of the invention although other elongated members can likewise be assembled in the same manner according to the teachings herein. The support members can be joined at 45 degree or 90 degree angles by the use of star-shaped holes having 8-points and a fastener including a bolt which has a neck having a matching star-shaped cross-section.

FINALLY, STILL YET ANOTHER EXAMPLE, U.S. Pat. No. 5,535,974 to Savitski teaches a scaffold bracket which is removably attachable to an elongated member such as the stud of a building under construction. The scaffold bracket includes a support structure having a support arm, and first and second grippers attached to the support structure. The first and second grippers engage the front and back surfaces of the elongated member, respectively. When the bracket is mounted to the elongated member, the support arm extends substantially horizontally. In this mounted position, a downward force on the support arm causes the first and second grippers to exert a gripping force on the elongated member. The invention also includes a scaffolding system employing such a scaffold bracket.

It is apparent that numerous innovations for joining devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide adjustable 3-way scaffold fasteners that avoids the disadvantages of the prior art.

ANOTHER OBJECT of the present invention is to provide adjustable 3-way scaffold fasteners that is simple and inexpensive to manufacture.

STILL ANOTHER OBJECT of the present invention is to provide adjustable 3-way scaffold fasteners that is simple to use.

BRIEFLY STATED, YET ANOTHER OBJECT of the present invention is to provide adjustable 3-way scaffolding fasteners for holding together four corners of a scaffold with four upright members, two first cross members with extremes, and two second cross members with extremes. The fasteners include a pair of right fasteners and a pair of left fasteners. Each fastener of the pair of right fasteners connects one extreme of the extremes of one cross member of the two first cross members and one extreme of the extremes of one cross member of the two second cross members to an upright of the four upright members of the scaffold, and are separate and diametrically opposed to each other when being used. Each fastener of the pair of left fasteners connects the other extreme of the extremes of the one cross member of the two first cross members and the other extreme of the extremes of the one cross member of the two second cross members to another upright of the four upright members of the scaffold, and are separate and diametrically opposed to each other and opposite to the pair of right fasteners when being used.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view illustrating the present invention in use;

FIG. 2 is a diagrammatic perspective view illustrating the present invention being utilized to hold together four corners of a typical scaffold;

FIG. 3 is an enlarged diagrammatic side elevational view of just a single right joint fastener enclosed in the dotted ellipse identified by arrow 3 in FIG. 2;

FIG. 4 is a diagrammatic front elevational view taken in the direction of arrow 4 in FIG. 3; and FIG. 5 is an enlarged diagrammatic cross sectional view, with 14 parts broken away, taken on line 5—5 in FIG. 3.

LIST OF REFERENCE NUMERALS UTILIZED IN THE DRAWING 10 adjustable 3-way scaffolding fasteners of the present invention
12 four corners of typical scaffold 14
14 typical scaffold
16 pair of right fasteners
18 pair of left fasteners
20 vertical receiving member of each fastener of pair of right fasteners 16
22 throughsocket passing vertically through vertical receiving member 20 of each fastener of pair of right fasteners 16 in Y-direction of 3-dimensional orthogonal array
24 upright member of typical scaffold 14
26 first horizontal receiving member of each fastener of pair of right fasteners 16
27 common front lower edge
28 throughsocket passing horizontally through first horizontal receiving member 26 of each fastener of pair of right fasteners 16 in Z-direction of 3-dimensional orthogonal array
29 first cross member of typical scaffold
30 second horizontal receiving member of each fastener of pair of right fasteners 16
32 throughsocket passing horizontally through second horizontal receiving member 30 of each fastener of pair of right fasteners 16 in X-direction of 3-dimensional orthogonal array
34 second cross member of typical scaffold 14
35 gusset plate of each fastener of pair of right fasteners 16
36 one side of gusset plate 35 of each fastener of pair of right fasteners 16
38 other side of gusset plate 35 of each fastener of pair of right fasteners 16
40 three identical maintaining apparatus of each fastener of pair of right fasteners 16
42 unthreaded throughbore in exposed large wall 44 of each receiving member 20, 26, 30
44 exposed large wall of each receiving member 20, 26, 30
46 threaded nut welded concentrically over unthreaded throughbore 42 in exposed large wall 44 of each receiving member 20, 26, 30

47 threaded screw
48 point of threaded screw 47
50 thumbscrew head of threaded screw 47

DETAILED DESCRIPTION OF THE PREFERRED EMBODIMENT

Referring now to the figures in which like numerals indicate like parts, and particularly to FIG. 1, the adjustable 3-way scaffolding fasteners of the present invention are shown generally at 10 being utilized to hold together four corners 12 of a typical scaffold 14.

The configuration of the adjustable 3-way scaffolding fasteners 10 can best be seen in FIGS. 2–5, and as such will be discussed with reference thereto.

The adjustable 3-way scaffolding fasteners 10 include a pair of right fasteners 16 that are separate and diametrically opposed to each other when being used and a pair of left fasteners 18 that are separate and diametrically opposed to each other and opposite to the pair of right fasteners 16 when being used.

Each fastener of the pair of right fasteners 16 has a vertical receiving member 20 that resembles a section of a vertically-oriented box beam and is rectangular-parallelepiped-shaped and has a throughsocket 22 passing vertically therethrough in a Y-direction of a 3-dimensional orthogonal array which is rectangular-parallelepiped-shaped and disposed coaxially through the vertical receiving member 20 for vertically receiving an upright member 24 of the typical scaffold 14.

Each fastener of the pair of right fasteners 16 further has a first horizontal receiving member 26 that resembles a section of a horizontally-oriented box beam and is rectangular-parallelepiped-shaped and has a throughsocket 28 passing horizontally therethrough in a Z-direction of the 3-dimensional orthogonal array which is rectangular-parallelepiped-shaped and disposed coaxially through the first horizontal receiving member 26 for horizontally receiving a first cross member 29 of the typical scaffold 14.

The first horizontal receiving member 26 is attached to, and disposed to one side of, the vertical receiving member 20 and forms therewith a common front lower edge 27, and is identical thereto, except for the throughsocket 22 in the vertical receiving member 20 and the throughsocket 28 in the first horizontal receiving member 26 being offset 90 degrees relative to each other.

Each fastener of the pair of right fasteners 16 further has a second horizontal receiving member 30 that resembles a section of a horizontally-oriented box beam and is rectangular-parallelepiped-shaped and has a throughsocket 32 passing horizontally therethrough in a X-direction of the 3-dimensional orthogonal array which is rectangular-parallelepiped-shaped and disposed coaxially through the second horizontal receiving member 30 for horizontally receiving a second cross member 34 of the typical scaffold 14.

The second horizontal receiving member 30 is attached to, and extends forwardly and downwardly from the common front lower edge 27 and provides a ledge for additional support for the first cross member 29 of the typical scaffold 14, and is identical to both the vertical receiving member 20 and the first horizontal receiving member 26, except for the throughsocket 22 in the vertical receiving member 20, the throughsocket 28 in the first horizontal receiving member 26, and the throughsocket 32 in the second horizontal receiving member 30 being offset 90 degrees relative to each other.

Each fastener of the pair of right fasteners 16 further has a gusset plate 35 that is right-isosceles-triangular-shaped and whose one side 36 is welded to the vertical receiving member 20 and the first horizontal receiving member 26, where they abut at their bottoms, and whose other side 38 is welded to the second horizontal receiving member 30 so as to maintain the second horizontal receiving member 30 on the common front lower edge 27.

Each fastener of the pair of right fasteners 16 further has three identical maintaining apparatus 40, each of which is for maintaining the upright member 24 of the typical scaffold 14 in the vertical receiving member 20, the first cross member 29 of the typical scaffold 14 in the first horizontal receiving member 26, and the second cross member 34 of the typical scaffold 14 in the second horizontal receiving member 30.

As shown in FIG. 5, each maintaining apparatus 40 includes an unthreaded throughbore 42 in an exposed large wall 44 of each receiving member 20, 26, 30, a threaded nut 46 welded concentrically over the unthreaded throughbore 42, and a threaded screw 47 with a point 48 and a thumb-screw head 50 so as the threaded screw 47 threads into the threaded nut 46, the point 48 thereof passes freely through the unthreaded throughbore 42 and pierces into the respective member 24, 29, 34 of the typical scaffold 14 and maintains it in the respective receiving member 20, 26, 30.

Each fastener of the pair of left fasteners 18 is identical to each fastener of the pair of right fasteners 16, except that the first horizontal receiving member 26 is on the other side of the vertical receiving member 20.

It will be understood that each of the elements described above, or two or more together, may also find a useful application in other types of constructions differing from the types described above.

While the invention has been illustrated and described as embodied in adjustable 3-way scaffold fasteners, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. Adjustable 3-way scaffolding fasteners for holding together four corners of a scaffold with four upright members, two first cross members with extremes, and two second cross members with extremes, said fasteners comprising:
    a) a pair of right fasteners, each of which for connecting one extreme of the extremes of one cross member of the two first cross members and one extreme of the extremes of one cross member of the two second cross members to an upright of the four upright members of the scaffold, and being separate and diametrically opposed to each other when being used; and
    b) a pair of left fasteners, each of which for connecting the other extreme of the extremes of the one cross member of the two first cross members and the other extreme of the extremes of the one cross member of the two second cross members to another upright of the four upright members of the scaffold, and being separate and diametrically opposed to each other and opposite to said pair of right fasteners when being used; each fastener of said pair of right fasteners and said pair of left fasteners having a vertical receiving member being rectangular-parallelepiped-shaped and resembling a section of a vertically-oriented box beam; said vertical receiving member having a throughsocket passing vertically therethrough in a Y-direction of a 3-dimensional orthogonal array; each fastener of said pair of right fasteners and said pair of left fasteners further having a first horizontal receiving member being rectangular-parallelepiped-shaped and resembling a section of a horizontally-oriented box beam; said first horizontal receiving member having a throughsocket passing horizontally therethrough in a Z-direction of the 3-dimensional orthogonal array; said first horizontal receiving member of each fastener of said pair of right fasteners being attached to, and disposed to one side of, said vertical receiving member and forming therewith a common front lower edge, and being identical thereto, except for said throughsocket in said vertical receiving member and said throughsocket in said first horizontal receiving member being offset 90 degrees relative to each other; said first horizontal receiving member of each fastener of said pair of left fasteners being attached to, and disposed to the other side of, said vertical receiving member and forming therewith a common front lower edge, and being identical thereto, except for said throughsocket in said vertical receiving member and said throughsocket in said first horizontal receiving member being offset 90 degrees relative to each other; each fastener of said pair of right fasteners and said pair of left fasteners further having a second horizontal receiving member being rectangular-parallelepiped-shaped and resembling a section of a horizontally-oriented box beam; said second horizontal receiving member having a throughsocket passing horizontally therethrough in a X-direction of the 3-dimensional orthogonal array; said second horizontal receiving member being attached to, and extending forwardly and downwardly from said common front lower edge and providing a ledge for additional support for the cross member of the two first cross members of the scaffold, and being identical to both said vertical receiving member and said first horizontal receiving member, except for said throughsocket in said vertical receiving member, said throughsocket in said first horizontal receiving member, and said throughsocket in said second horizontal receiving member being offset 90 degrees relative to each other.

2. The fasteners as defined in claim 1, wherein said throughsocket in said vertical receiving member is rectangular-parallelepiped-shaped and disposed coaxially therethrough for vertically receiving an upright member of the four upright members of the scaffold.

3. The fasteners as defined in claim 1 wherein said throughsocket in said first horizontal receiving member is rectangular-parallelepiped-shaped and disposed coaxially therethrough for horizontally receiving a cross member of the two first cross members of the scaffold.

4. The fasteners as defined in claim 1, wherein said throughsocket in said second horizontal receiving member is rectangular-parallelepiped-shaped and disposed coaxially therethrough for horizontally receiving a cross member of the two second cross members of the scaffold.

5. The fasteners as defined in claim 1, wherein each fastener of said pair of right fasteners and said pair of left fasteners further has a gusset plate that is right-isosceles-triangular-shaped and whose one side is welded to said vertical receiving member and said first horizontal receiving member and whose other side is welded to said second horizontal receiving member so as to maintain said second horizontal receiving member on said common front lower edge.

6. The fasteners as defined in claim 1, wherein each fastener of said pair of right fasteners and said pair of left fasteners further has three identical maintaining apparatus, each of which is for maintaining one upright of the four uprights of the scaffold in said vertical receiving member, one cross member of the two first cross members of the scaffold in said first horizontal receiving member, and one cross member of the two second cross member of the scaffold in said second horizontal receiving member.

7. The fasteners as defined in claim 6, wherein each maintaining apparatus of said three identical maintaining apparatus includes an unthreaded throughbore in an exposed large wall of each receiving member.

8. The fasteners as defined in claim 7, wherein each maintaining apparatus of said three identical maintaining apparatus further includes a threaded nut welded concentrically over said unthreaded throughbore.

9. The fasteners as defined in claim 8, wherein each maintaining apparatus of said three identical maintaining apparatus further includes a threaded screw with a point and a thumbscrew head so as said threaded screw threads into said threaded nut, said point thereof passes freely through said unthreaded throughbore for piercing into a respective member of the scaffold and maintaining it in said respective receiving member.

* * * * *